US008744529B2

(12) United States Patent
Freund et al.

(10) Patent No.: US 8,744,529 B2
(45) Date of Patent: Jun. 3, 2014

(54) ENHANCED MOBILE DEVICE HAVING MULTIPLE HOUSING CONFIGURATIONS

(75) Inventors: Joseph M. Freund, Fogelsville, PA (US); Roger A. Fratti, Mohnton, PA (US); John M. DeLucca, Montgomery, PA (US)

(73) Assignee: LSI Corporation, San Jose, CA (US)

( * ) Notice: Subject to any disclaimer, the term of this patent is extended or adjusted under 35 U.S.C. 154(b) by 30 days.

(21) Appl. No.: 13/595,277

(22) Filed: Aug. 27, 2012

(65) Prior Publication Data

US 2014/0057682 A1 Feb. 27, 2014

(51) Int. Cl.
*H04M 1/02* (2006.01)

(52) U.S. Cl.
USPC ............. 455/566; 455/575.3; 455/575.4; 455/575.1

(58) Field of Classification Search
USPC ............. 455/566, 575.3, 575.4, 575.1
See application file for complete search history.

(56) References Cited

U.S. PATENT DOCUMENTS

| | | | | |
|---|---|---|---|---|
| 7,158,634 | B2 * | 1/2007 | Eromaki | 379/433.13 |
| 7,333,062 | B2 | 2/2008 | Leizerovich et al. | |
| 7,483,723 | B2 | 1/2009 | Söderlund | |
| 7,599,181 | B2 * | 10/2009 | Chuang et al. | 361/679.55 |
| 7,652,877 | B2 * | 1/2010 | Nishizawa | 361/679.27 |
| 2007/0057852 | A1 * | 3/2007 | Leizerovich et al. | 343/702 |
| 2007/0184812 | A1 * | 8/2007 | Bitton | 455/344 |
| 2007/0287512 | A1 | 12/2007 | Kilpi et al. | |
| 2008/0218955 | A1 * | 9/2008 | Nishizawa | 361/681 |
| 2008/0311963 | A1 * | 12/2008 | Strawn | 455/575.1 |
| 2010/0151925 | A1 | 6/2010 | Vedurmudi et al. | |
| 2010/0227656 | A1 * | 9/2010 | Kristensson et al. | 455/575.4 |
| 2010/0321871 | A1 * | 12/2010 | Diebel et al. | 361/679.01 |
| 2011/0299235 | A1 | 12/2011 | Liu et al. | |
| 2012/0149448 | A1 * | 6/2012 | Fargrenius et al. | 455/575.4 |
| 2012/0257368 | A1 * | 10/2012 | Bohn et al. | 361/809 |
| 2012/0307423 | A1 * | 12/2012 | Bohn et al. | 361/679.01 |

OTHER PUBLICATIONS

"Loop Antennas," Reflections and Standing Wave Ratio, www.ycars.org/EFRA/Module C/AntLoop.htm, Jul. 2012, 4 pages.
"RB8310 014/73 TECH," Official Ray-Ban Store, Ray-Ban RD8310 Tech Sunglasses, www.ray-ban.com/usa/rb8310, 1 page.
"RAY-BAN," Ray-Ban Official Web Site/Tech—USA, www.ray-ban.com/usa/science/tech, 2 pages.

* cited by examiner

*Primary Examiner* — Jinsong Hu
*Assistant Examiner* — Jean Chang
(74) *Attorney, Agent, or Firm* — Ryan, Mason & Lewis, LLP

(57) ABSTRACT

An apparatus comprises a first housing having a top surface and a bottom surface, a second housing having a top surface and a bottom surface, and one or more supports coupling the first housing to the second housing such that the first and second housings are electrically connected and the bottom surface of the first housing overlays the top surface of the second housing. The one or more supports are configurable in at least a first configuration wherein the bottom surface of the first housing and the top surface of the second housing are substantially contiguous with one another and a second configuration wherein the bottom surface of the first housing and the top surface of the second housing are separated by a space.

23 Claims, 11 Drawing Sheets

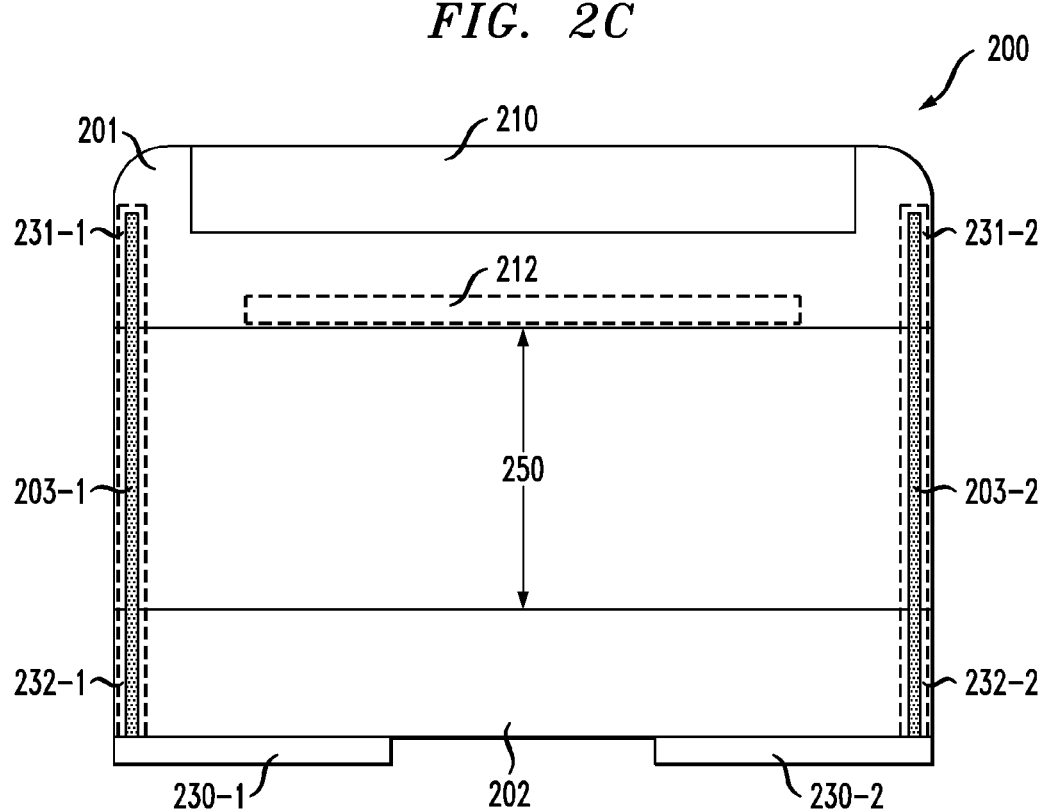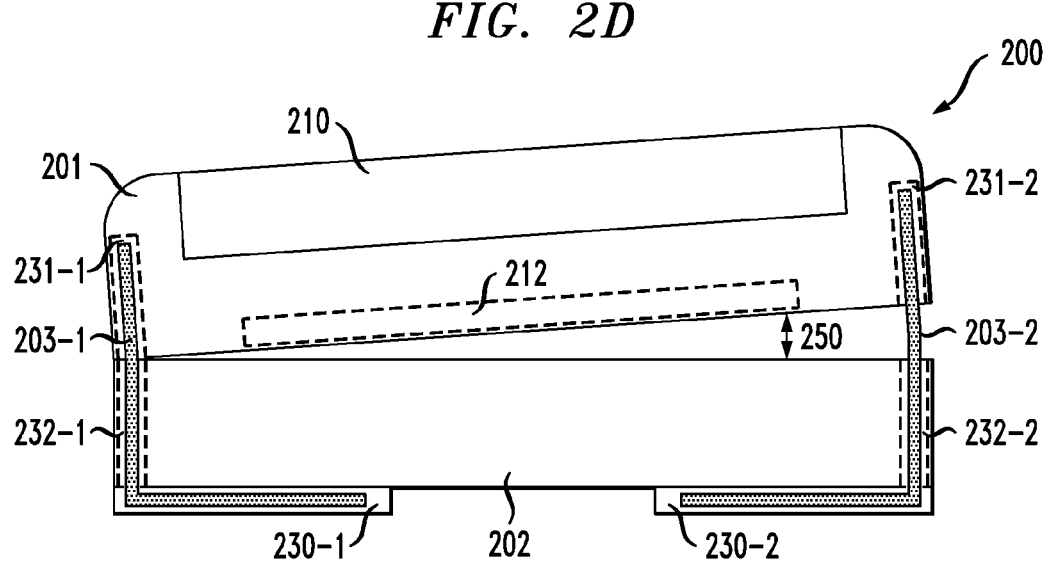

ENHANCED MOBILE DEVICE HAVING MULTIPLE HOUSING CONFIGURATIONS

BACKGROUND

Currently, most mobile devices are sectioned in two halves. A top half of the mobile device normally houses one or more components, including but not limited to a display, processor, memory, input device, battery, expansion card, etc. Some mobile devices, including cellular phones and tablets, also include subscriber identity module (SIM) cards. A bottom half of most mobile devices is used as a cover. The top half and bottom half may be joined in a variety of ways. One of the most common ways in which the top and bottom halves of mobile devices are joined and separated is through a snap fit. The bottom half in most mobile devices is simply a cover, which when removed provides access to the battery and SIM card of the mobile device. The bottom half or cover may also be removed to provide access to expansion cards such as flash memory. The cover protects the battery and other components of the mobile device and provides access to the battery and other components for replacement and service. In many mobile devices, however, the battery is not held securely, such that when the bottom half is removed the battery is readily dislodged rendering the mobile device inoperable. Thus, the bottom half or cover is used primarily to hold the battery in place with minimal additional functionality.

In recent years, mobile devices have begun to incorporate antennas and network interfaces for a variety of network types. One such network interface provides near field communication (NFC) functionality. NFC functionality allows wireless pairing between two or more mobile devices. Pairing is achieved by touching two mobile devices together or by bringing two devices within a certain distance of one another. When two or more mobile devices such as cellular phones or tablets are paired using NFC, the mobile devices can share information, including but not limited to contact information, media files or links, and payment or other transaction information. As the proliferation of mobile devices which incorporate NFC functionality increases, however, unwanted pairing of mobile devices may occur.

SUMMARY

An illustrative embodiment of the present invention provides an apparatus configurable between two or more configurations providing enhanced functionality.

In one embodiment of the invention, an apparatus comprises a first housing having a top surface and a bottom surface, a second housing having a top surface and a bottom surface, and one or more supports coupling the first housing to the second housing such that the first and second housings are electrically connected and the bottom surface of the first housing overlays the top surface of the second housing. The one or more supports are configurable in at least a first configuration wherein the bottom surface of the first housing and the top surface of the second housing are substantially contiguous with one another and a second configuration wherein the bottom surface of the first housing and the top surface of the second housing are separated by a space.

More particularly, in one or more embodiments the one or more supports may be further configurable in a third configuration wherein a first edge of the bottom surface of the first housing is substantially contiguous with a corresponding first edge of the top surface of the second housing and wherein a second edge of the bottom surface of the first housing and a corresponding second edge of the top surface of the second housing are separated by a space.

An antenna may be formed by connecting the first housing and the second housing with wiring through at least one of the one or more supports. The antenna may be a loop antenna such that in the first configuration the loop antenna has a first length and in the second configuration the loop antenna has a second length, the second length being greater than the first length. In the first configuration the antenna may be substantially omnidirectional and in the second configuration the antenna may be substantially directional.

One or more illustrative embodiments of the invention can provide enhanced functionality of a mobile device, including but not limited to easy access to one or more components of the mobile device, grip features for securely holding the mobile device, integrating a stand feature in the mobile device and providing a reconfigurable antenna in the mobile device.

BRIEF DESCRIPTION OF THE DRAWINGS

FIG. 2C is a side view depicting the exemplary user device of FIG. 2A in a fully open configuration, according to an embodiment of the invention.

FIG. 2D is a side view depicting the exemplary user device of FIG. 2A in a stand configuration, according to an embodiment of the invention.

DETAILED DESCRIPTION

Embodiments of the invention will be illustrated herein in conjunction with an exemplary apparatus including a display and touch screen frequently associated with cellular phones and tablets, etc. It is to be understood, however, that techniques of the present invention are not limited to the methods and apparatus shown and described herein. Rather, the invention is more generally applicable to mobile devices generally, including but not limited to such items as personal digital assistants (PDAs), mobile computing devices, mobile communication devices, handheld gaming devices, e-book readers, etc. Likewise, the invention may be used in conjunction with mobile devices of a variety of form factors, including but not limited to those commonly referred to within the field as clamshells, sliders, smart phones, candybars, etc. Further, although embodiments of the invention depict a touch screen input device, any input device or combination of input devices may be used in embodiments of the invention, such as trackballs, styluses, touchpads, microphones, keyboards, etc. Likewise, the display may be any one of or combination of output devices such as liquid crystal displays (LCD), light emitting diode (LED) displays, plasma displays, electronic paper, etc.

The terms "mobile device" and "user device" are used interchangeably herein, and are intended to be construed broadly as discussed above.

Figure 1:
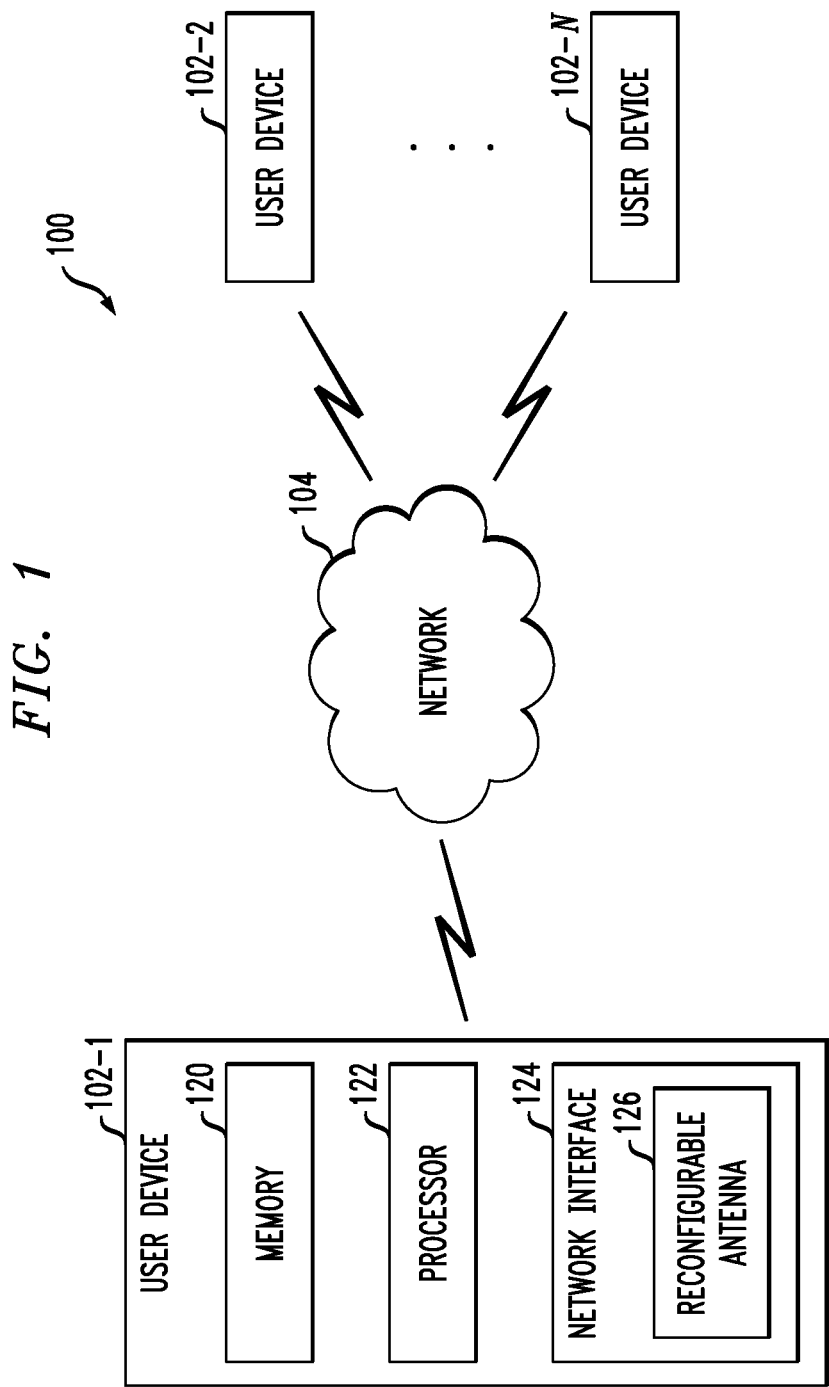
FIG. 1 shows a wireless system, according to an illustrative embodiment of the invention.

FIG. 1 illustrates a wireless system 100. User devices 102 are wirelessly connected to a network 104. The network 104 connects the user devices 102 to one another, and may also allow the user devices 102 to connect with other networks. For example, the network 104 may be a cellular network, a WiFi network, a Bluetooth® network, the Internet, etc. User devices 102 may also connect with one or more other networks with the network 104 acting as a bridge. In addition, although FIG. 1 illustrates a wireless network 104, user devices 102 may also connect to a wired network. One skilled in the art will readily appreciate that numerous network arrangements are possible, and that embodiments of the invention may be utilized with a variety of networks. Embodiments of the invention may also be utilized when a given user device such as user device 102-1 is not connected to any network. In some embodiments, user devices may not be equipped with any network interface.

User device 102-1 has a processor 122, a memory 120 and a network interface 124. The network interface 124 includes a reconfigurable antenna 126. In some embodiments, a single network interface 124 provides access to a variety of network types. In other embodiments, user device 102-1 may include separate network interfaces for connecting to various network types. In addition, although not explicitly shown in FIG. 1, user device 102-1 may include various other components such as a display, input device, control circuitry, etc.

Figure 2A:
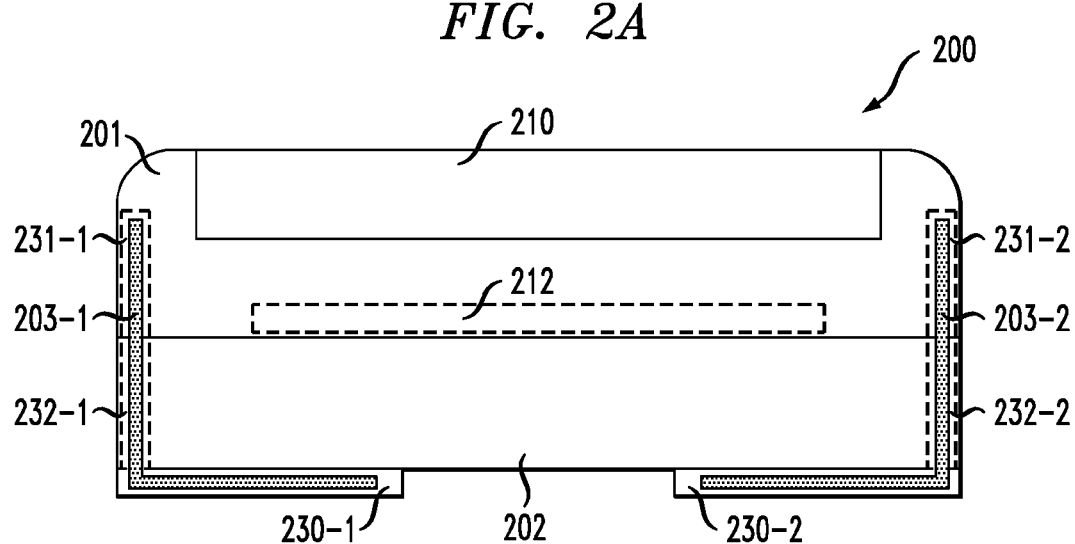
FIG. 2A is a side view depicting an exemplary user device in a closed configuration, according to an embodiment of the invention.

FIG. 2A is a side view of a user device 200. User device 200 has a top or first housing 201 and bottom or second housing 202. The top housing 201 includes a display 210 and a storage cavity 212. Display 210 may be a combined touch screen/keyboard acting as both an input and output for the user device 200. The bottom housing 202 houses a battery. It is important to note that user device 200 may include numerous other components, including the processor 122, memory 120, network interface 124 and reconfigurable antenna 126 as shown in the user device 102-1 in FIG. 1. In addition, the user device 200 may include control circuitry, one or more locking mechanisms, SIM card storage, etc. The top housing 201 and the bottom housing 202 are electrically connected. Thus, the user device 200 may have the display 210 and its associated electronics, processor, memory, etc. in the top housing 201 with the battery which powers the display 210 and its associated electronics, processor, memory, etc. in the bottom housing 202. In some embodiments, part or all of the associated electronics may be included in the bottom housing 202. In still other embodiments, both the top and bottom housing may include a battery. Since the top housing 201 and the bottom housing 202 are electrically connected, one skilled in the art will readily appreciate that user devices with various components in a variety of arrangements are possible.

In FIG. 2A, the user device 200 is in what is referred to herein as a "closed" configuration. The closed configuration is a configuration in which a bottom surface of the top housing 201 contacts and overlays the top surface of the bottom housing 202. It is important to note, however, that the bottom surface of the top housing 201 and the top surface of the bottom housing 202 need not be physically touching one another, but instead may simply be within a specified distance of one another. In addition, while FIG. 2A shows a top housing 201 with a bottom surface which overlays the entire top surface of the bottom housing 202, in other embodiments the bottom surface of the top housing 201 and the top surface of the bottom housing 202 may be different sizes such that only a portion of the bottom surface of the top housing 201 overlays a portion of the top surface of the bottom housing.

The top housing 201 and bottom housing 202 are connected by one or more supports. FIG. 2A shows a first sliding support 203-1 and a second sliding support 203-2. Sliding support 203-1 connects to the top housing 201 through guide 231-1 and to the bottom housing 202 through guides 230-1 and 232-1. The second sliding support 203-2 is similarly connected to the top housing 201 through guide 231-2 and to the bottom housing 202 through guides 230-2 and 232-2. In the user device 200, the sliding supports 203 are located at corners of the user device. One skilled in the art will readily appreciate that the number and placement of sliding supports 203 may vary. For example, the sliding supports 203 may be placed on an edge of the user device, and may cover a portion of or all of one or more edges of the user device. In addition, the length of the sliding supports 203 may not require the use of guides 230 as shown in FIG. 2A on the bottom surface of the bottom housing 202.

In a preferred embodiment, sliding supports 203 will be placed at the four vertical edges of a rectangular user device. Each sliding support 203 can slide independently of any of the other supports. The corner where guides 230-1 and 232-1 meet may be formed with a radius to allow the support to slide smoothly. The supports 203 are preferably made from a flexible, tubular material to allow for flexure and to route electrical connections between the top housing 201 and the bottom housing 202.

Figure 2B:
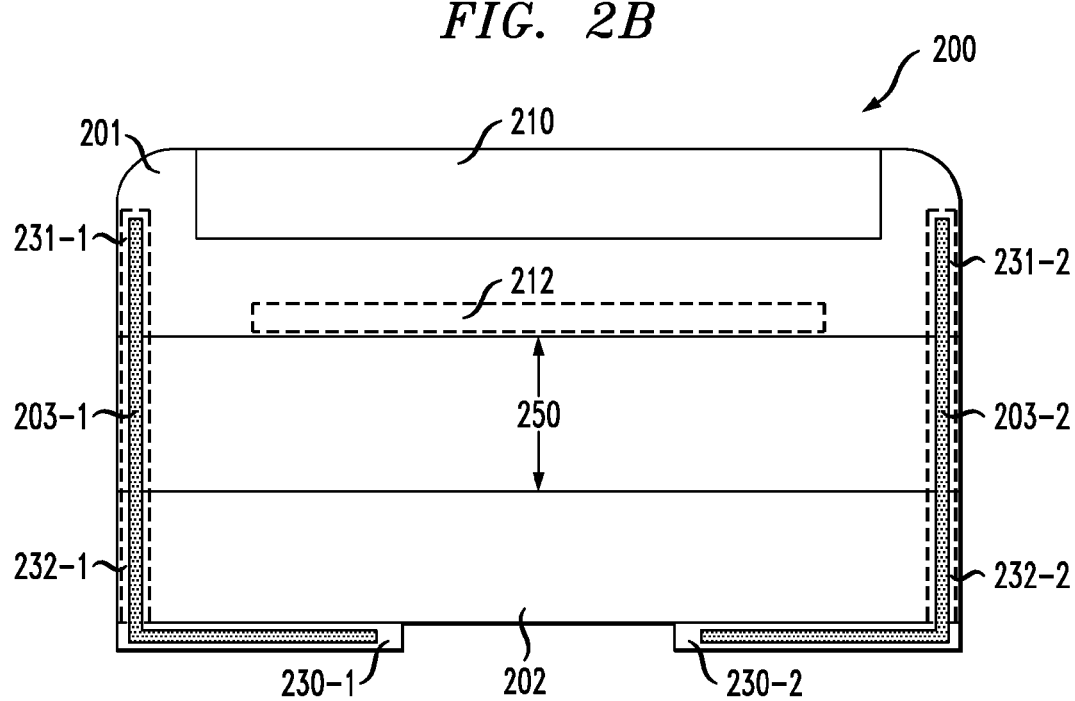
FIG. 2B is a side view depicting the exemplary user device of FIG. 2A in an intermediate open configuration, according to an embodiment of the invention.

FIG. 2B shows a side view of the user device 200 in what is referred to herein as an "intermediate open" configuration.

In the intermediate open configuration, sliding supports 203 are partially extended relative to the closed configuration to create a space 250 separating the top housing 201 and the bottom housing 202. The space 250 permits access to the storage cavity 212 of the first housing. The storage cavity 212 can be used to store various items, such as money, keys, credit cards, etc. In some embodiments, the storage cavity 212 provides secure storage through the use of a locking mechanism (not shown) on the user device 200. The locking mechanism may be released mechanically or electromechanically via control circuitry. A user of the user device 200 could be required to enter a password or other input to the user device to release the locking mechanism. A user may also input a command to the user device which would cause control circuitry to adjust the supports 203 between configurations. The locking mechanism may also be used to keep the user device 200 rigid in a given configuration. It is important to note that while only a single storage cavity is shown in FIGS. 2A and 2B, alternate embodiments may include two or more storage cavities in the top housing 201. In addition, alternate embodiments may include one or more storage cavities in the bottom housing 202 in place of or in addition to any storage cavities in the top housing 201.

In addition or in place of the storage cavity 212, embodiments of the invention may incorporate other features into the bottom surface of the top housing 201 and/or the top surface of the bottom housing 202. For example, the bottom surface of the top housing 201 and/or the top surface of the bottom housing may include a grip feature to allow a user to securely hold and manipulate the user device 200. In some embodiments, the surface itself is formed to provide the grip feature, such as by forming one or more ridges on the surface. In other embodiments, a grip may be secured to the surface, such as by attaching a rubber pad on the surface. In addition, access to a SIM card or memory of the user device 200 such as flash memory may be provided in the intermediate open configuration.

FIG. 2C shows a side view of the user device 200 in what is referred to herein as a "fully open" configuration. In the fully open configuration, the sliding supports 203 are fully extended relative to the closed configuration to create a maximum space 250 between the top housing 201 and the bottom housing 202.

FIG. 2D shows a side view of the user device 200 in what is referred to herein as a "stand" configuration. In the stand configuration of FIG. 2D, sliding support 203-2 partially extends while the sliding support 203-1 does not extend relative to the closed configuration. Advantageously, this allows the user device 200 to stand on an edge of the device supported by partially extended sliding support 203-2. The extension of sliding support 203-2 can be adjusted relative to the closed configuration according to a user preference, such as obtaining an optimal viewing angle for the display 210. In the stand configuration, the space 250 between the bottom surface of top housing 201 and the top surface of the bottom housing 202 is greater at the edge of the user device 200 connected by support 203-2 than the edge of the user device 200 connected by support 203-1. The user device 200 may also be configured such that the space between the bottom surface of the top housing 201 and the top surface of the bottom housing 202 is greater at the edge of the user device 200 connected by support 203-1 than the edge of the user device connected by support 203-2. In addition, while FIG. 2C shows the bottom surface of the top housing 201 and the top surface of the bottom housing 202 touching one another near the edge of the user device 200 connected by support 203-1 in the stand configuration, the user device 200 may be arranged in a stand configuration where a space separates the edges of the user device connected by support 203-1 and support 203-2. The stand configuration more generally applies to situations in which a space separating the bottom surface of the top housing 201 and the top surface of the bottom housing 202 is greater at one edge of the user device than at another.

While FIGS. 2A-2D show the user device 200 in one of four configurations (closed, intermediate open, fully open and stand), it is important to note that the user device 200 may be configured in a numerous other configurations. One skilled in the art will readily appreciate that by virtue of the supports 203 being independent of one another, various other configurations not specifically discussed herein are possible.

Figure 2E:
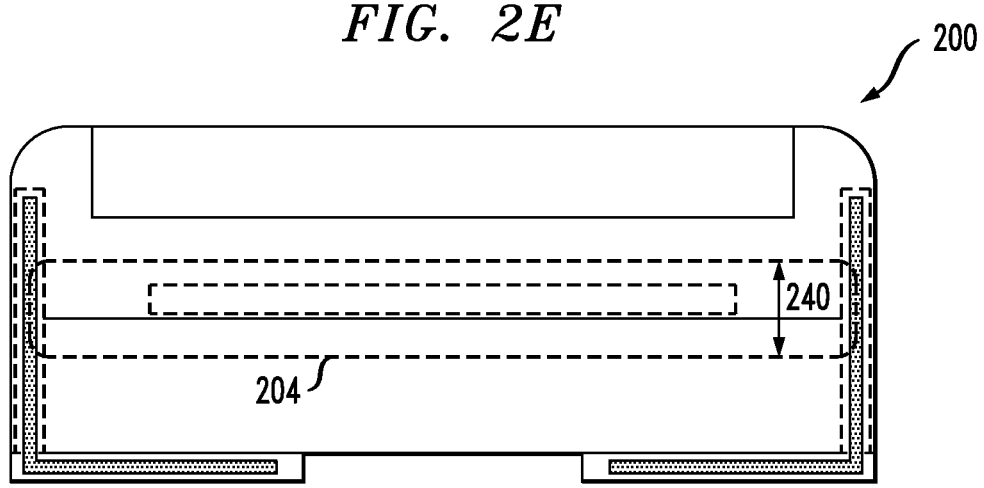
FIG. 2E is a side view depicting the exemplary user device of FIG. 2A with an antenna in the closed configuration, according to an embodiment of the invention.

FIG. 2E shows a side view of the user device 200 in the closed configuration of FIG. 2A with a reconfigurable antenna 204. In one embodiment, the reconfigurable antenna is an air-core coil loop antenna. The inductance L in μH of an air-core coil loop antenna is $$L = \frac{0.2a^2n^2}{3a + 9b + 10c}$$

where a is the average diameter of coils of the antenna wire in inches, n is the number of turns of the wire, b is the length of the coil in inches, and c is the radial depth of the winding in inches. In the closed configuration, the reconfigurable antenna has air core 240.

Figure 2F:
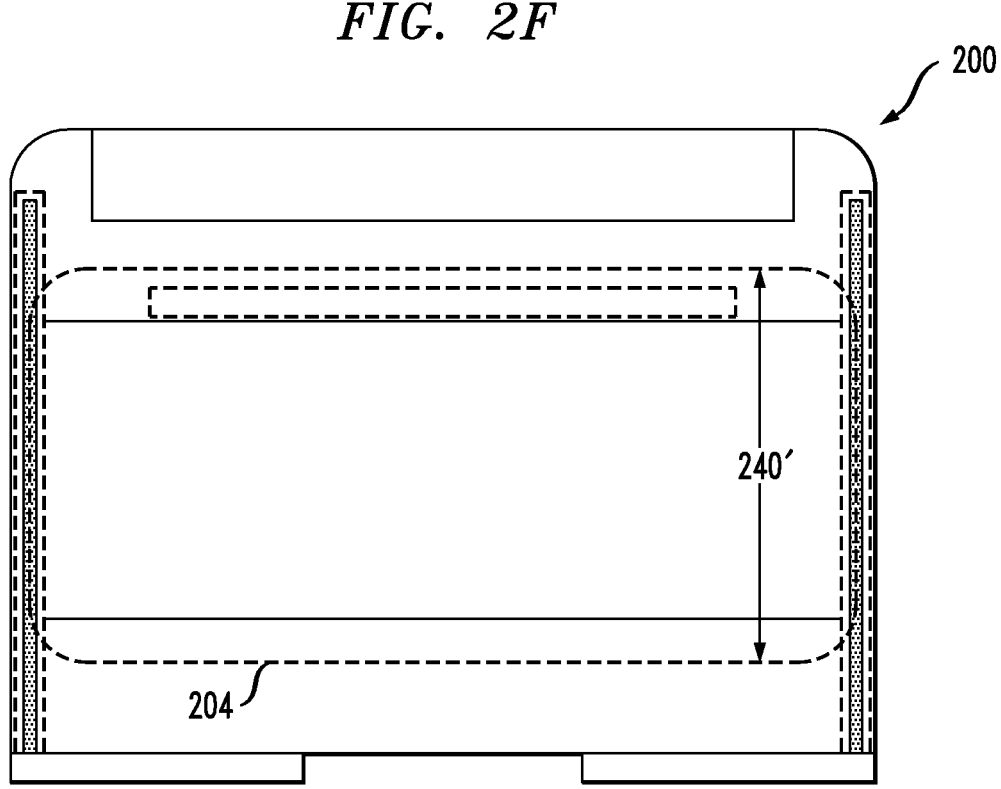
FIG. 2F is a side view depicting the exemplary user device of FIG. 2A with an antenna in the fully open configuration, according to an embodiment of the invention.

FIG. 2F shows a side view of the user device 200 in the fully open configuration of FIG. 2C with the reconfigurable antenna 204. The reconfigurable antenna 204 has a larger air core 240' in the fully open configuration, which improves the quality (Q) factor of the antenna. The permeability is 1 in the opening, corresponding to a low core loss. The larger air core further leads to lower parasitic inter winding capacitance, shifting the peak capacitance down in frequency. These changes lead to an increase in the overall efficiency of the antenna for a given radiation resistance and $R_{loss}$ term, although the capacitive reactance of the antenna is higher for the larger air core. Further details on the properties of air-core coil loop antennas may be found in Setian, Leo, "Practical Communication Antennas with Wireless Applications," Prentice Hall PTR, 1998, the disclosure of which is incorporated by reference herein.

Figure 3A:
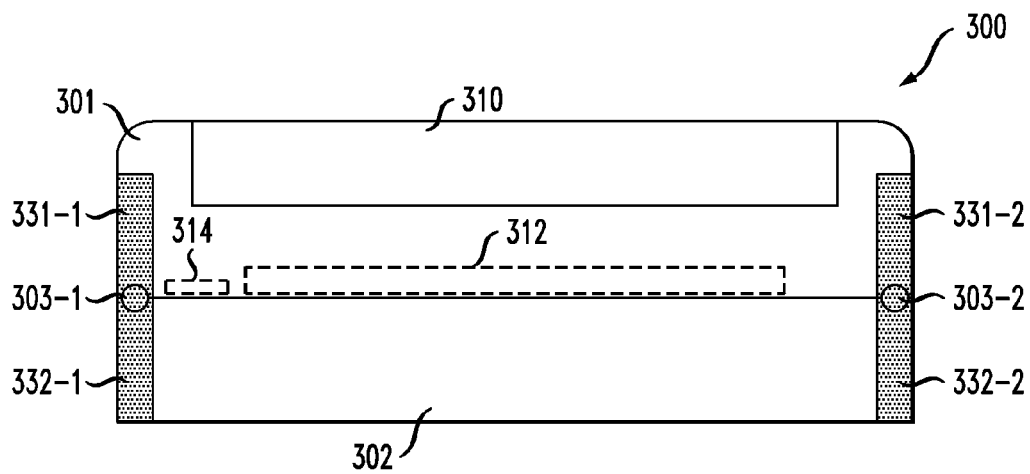
FIG. 3A is a side view depicting an exemplary user device in a closed configuration, according to an embodiment of the invention.

FIG. 3A shows a side view of user device 300 in the closed configuration. User device 300 uses telescoping supports in place of the sliding supports used in user device 200. User device 300 has a top housing 301 and a bottom housing 302. The top housing 301 includes a display 310, a storage cavity 312 and a SIM card slot 314. The top housing 301 connects to the bottom housing 302 through telescoping supports. Each telescoping support has a top guide 331 in the top housing 301 and a bottom guide 332 in the bottom housing 302. The top guides 331 and the bottom guides 332 are shown along a vertical edge parallel to vertical edges of the top housing 301 and the bottom housing 302, respectively.

Figure 3B:
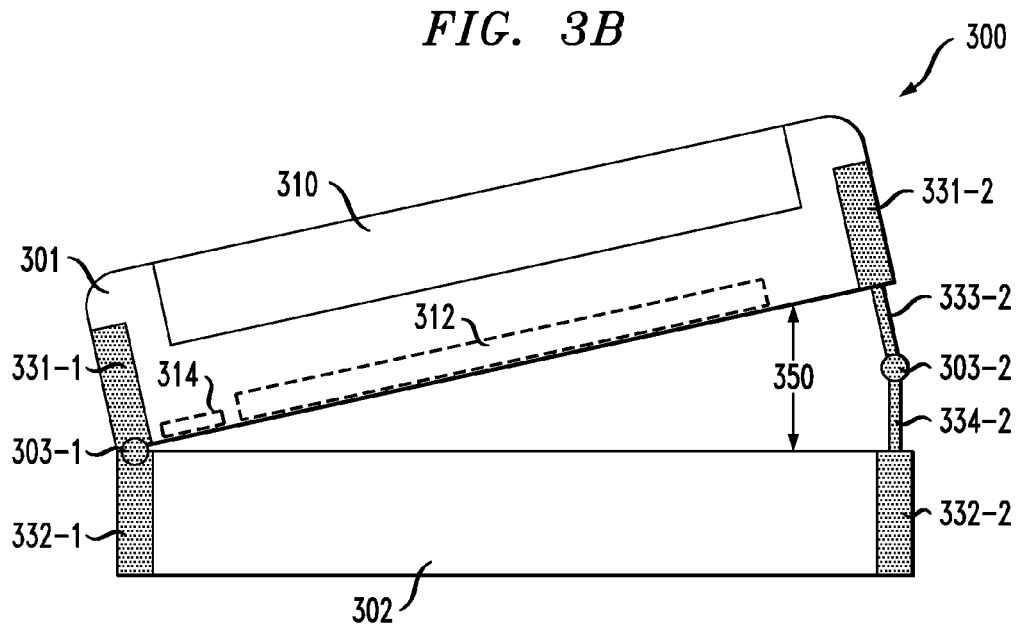
FIG. 3B is a side view depicting the exemplary user device of FIG. 3A in a stand configuration, according to an embodiment of the invention.

FIG. 3B shows a side view of the user device 300 in the stand configuration. In FIG. 3B, a top telescoping section 333-2 partially extends from top guide 331-2 relative to the closed configuration. The bottom telescoping section 334-2 partially extends from the bottom guide 332-2 relative to the closed configuration. The top telescoping section 333-2 connects to the bottom telescoping section 334-2 via a hinge 303-2. The top telescoping section 333-2 and bottom telescoping 334-2 can independently extend and retract from guides 331-2 and 332-2, respectively. The top telescoping section 333-2 and the bottom telescoping section 334-2 can also rotate with respect to one another around hinge 303-2. As such, the top telescoping section 333-2 and bottom telescoping section 334-2 can be adjusted to vary a space 350 between the top housing 301 and the bottom housing 302. As described above, a user may adjust the telescoping supports to obtain an optimal stand configuration or viewing angle for the display 310. The top telescoping sections 333 and bottom telescoping sections 334 are preferably tubular so as to allow electrical and other wiring to connect the top housing 301 and bottom housing 302.

Figure 3C:
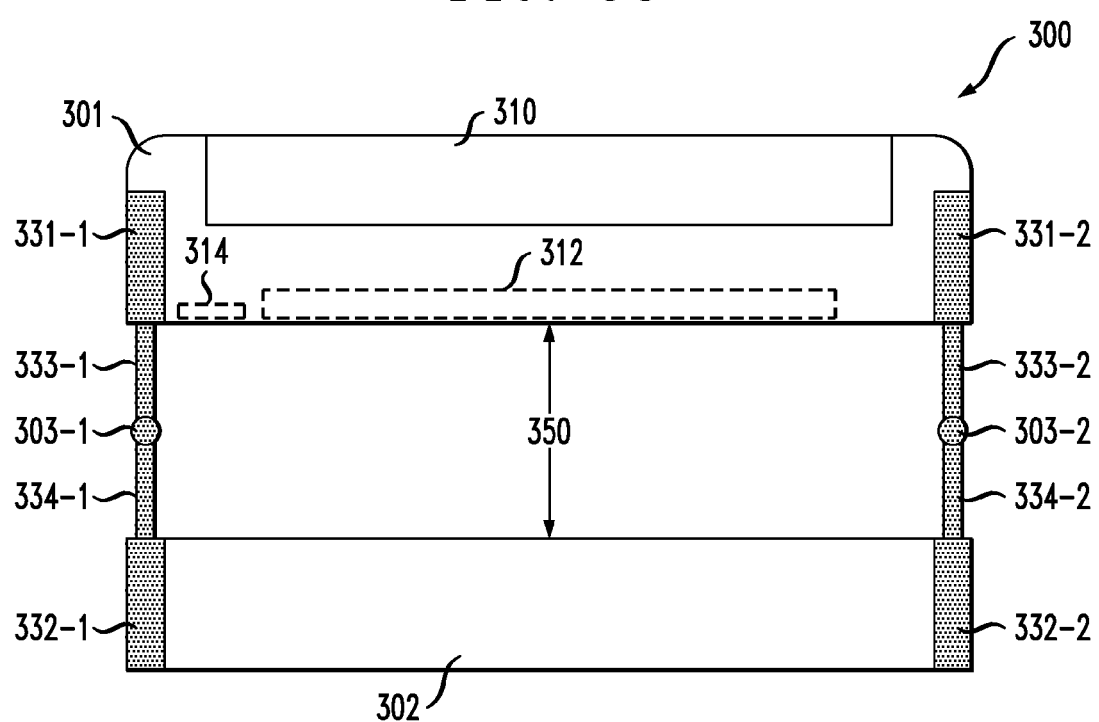
FIG. 3C is a side view depicting the exemplary user device of FIG. 3A in a fully open configuration, according to an embodiment of the invention.
Figure 3D:
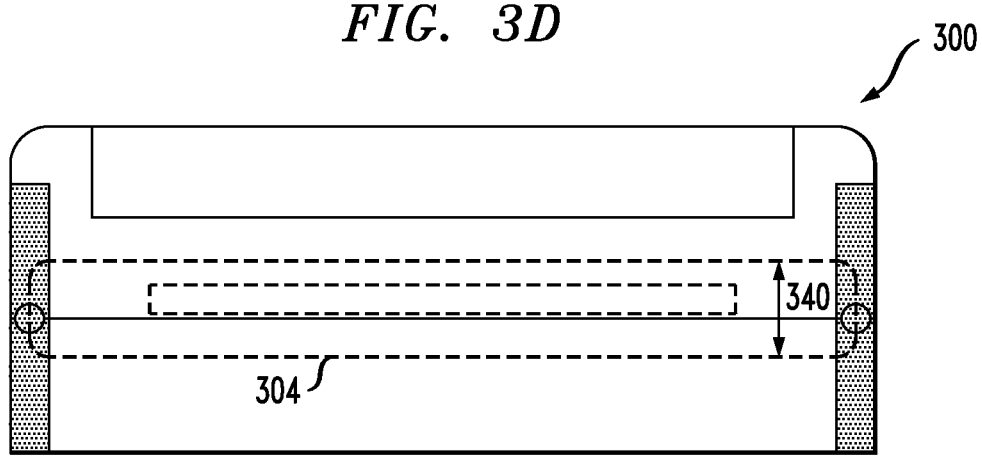
FIG. 3D is a side view depicting the exemplary user device of FIG. 3A with an antenna in the closed configuration, according to an embodiment of the invention.
Figure 3E:
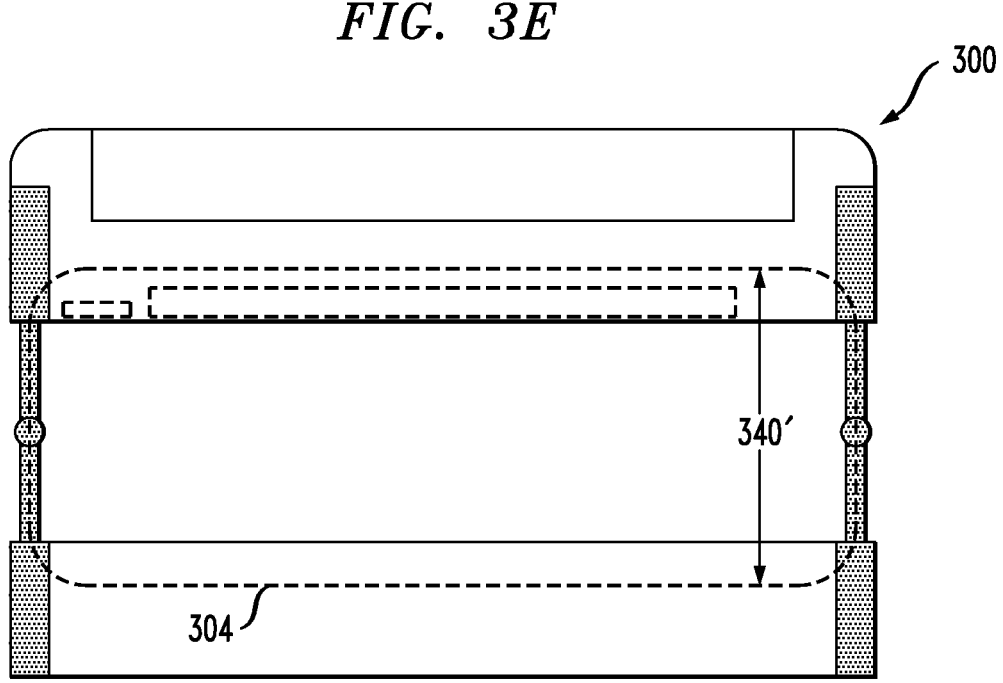
FIG. 3E is a side view depicting the exemplary user device of FIG. 3A with an antenna in the fully open configuration, according to an embodiment of the invention.

FIG. 3C shows a side view of the user device 300 in the fully open configuration. Top telescoping sections 333 and bottom telescoping sections 334 are fully extended relative to the closed configuration. FIG. 3D shows a side view of the user device 300 in the closed configuration with a reconfigurable antenna 304. FIG. 3E shows a side view of the user device 300 in the fully open configuration with the reconfigurable antenna 304. The air core 340 of the reconfigurable antenna 304 is smaller in the closed configuration than the air core 340' of the reconfigurable antenna 304 in the fully open configuration.

Figure 4A:
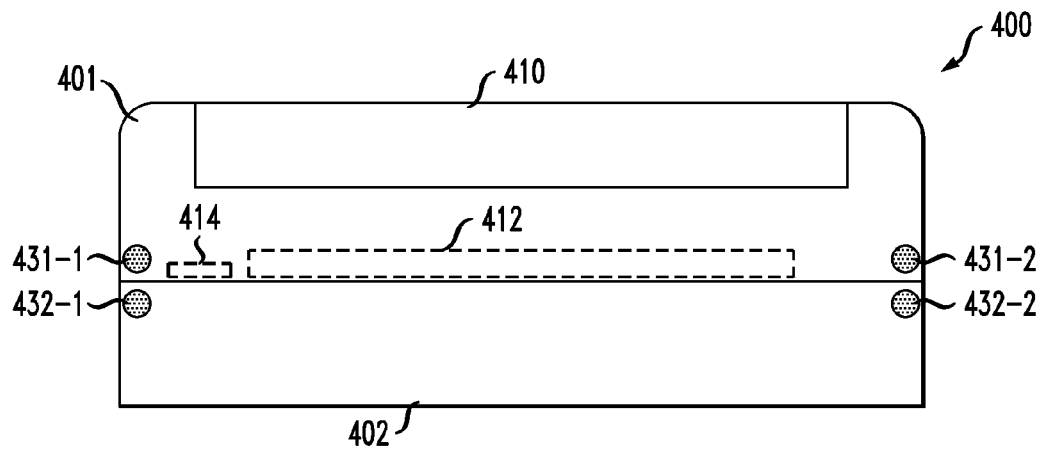
FIG. 4A is a side view depicting an exemplary user device in a closed configuration, according to an embodiment of the invention.

FIG. 4A shows a side view of a user device 400 in the closed configuration. The user device 400 has a top housing 401 and a bottom housing 402. Top housing 401 includes a display 410, storage cavity 412, SIM card slot 414 and hinges 431-1 and 431-2. Bottom housing 402 includes hinges 432-1 and 432-2.

Figure 4B:
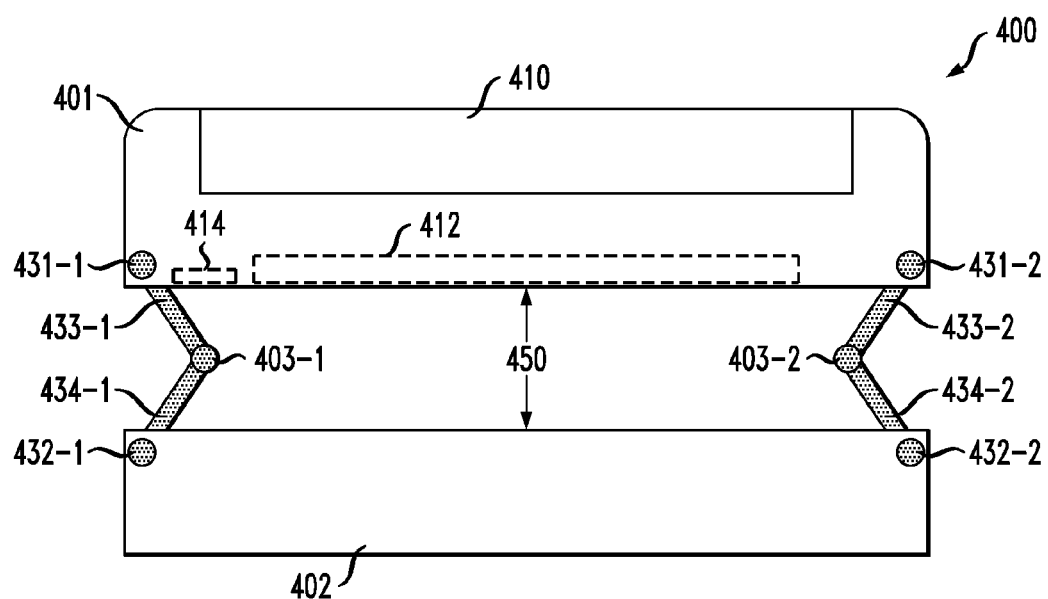
FIG. 4B is a side view depicting the exemplary user device of FIG. 4A in an intermediate open configuration, according to an embodiment of the invention.

FIG. 4B shows a side view of the user device 400 in the intermediate open configuration. Top hinge support 433-1 is coupled at a top end to hinge 431-1 and a bottom end to hinge 403-1. Similarly, top hinge support 433-2 is coupled at a top end to hinge 431-2 and a bottom end to hinge 403-2. Bottom hinge support 434-1 is coupled at a top end to hinge 403-1 and a bottom end to hinge 432-1. Similarly, bottom hinge support 434-2 is coupled at a top end to hinge 403-2 and a bottom end to hinge 432-2. The top hinge supports 433 and the bottom hinge supports 434 can rotate about hinges 431, 403 and 432 to increase or decrease a space 450 between the top housing 401 and the bottom housing 402. The hinge assembly comprising top hinge supports 433, bottom hinge supports 434, and hinges 431, 403 and 432 is preferably made of a light weight carbon fiber and resin composite tubular material. The material is tubular to allow for electrical wiring to pass through the hinge assembly and electrically connect the top housing 401 and bottom housing 402.

Figure 4C:
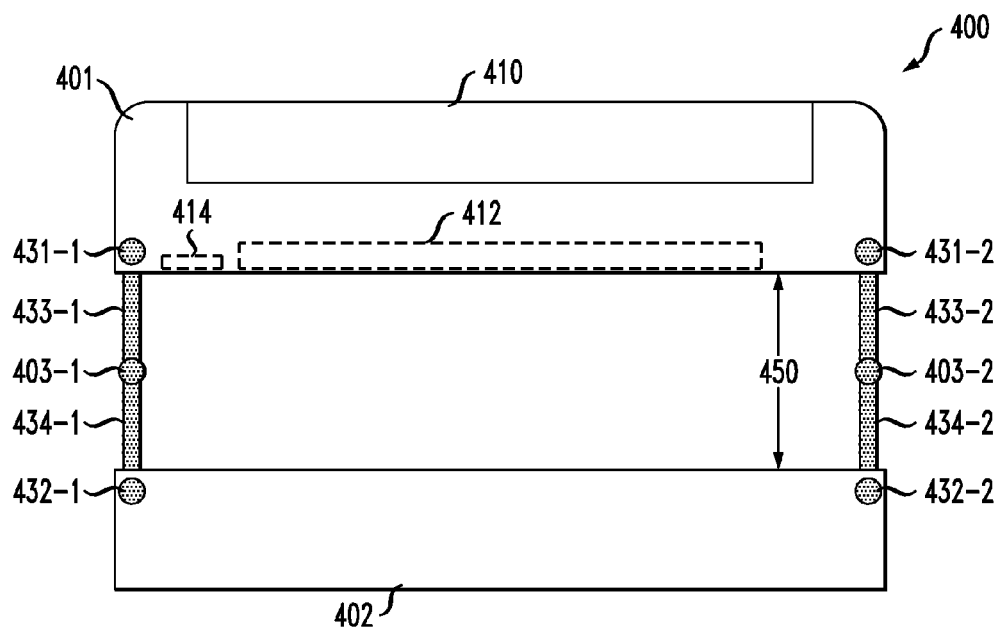
FIG. 4C is a side view depicting the exemplary user device of FIG. 4A in a fully open configuration, according to an embodiment of the invention.

FIG. 4C shows a side view of the user device 400 in the fully open configuration. Top hinge supports 433 and bottom hinge supports 434 are rotated to form a 180° angle about hinge 403-1 to maximize the space 450 between the top housing 401 and the bottom housing 402.

Figure 4D:
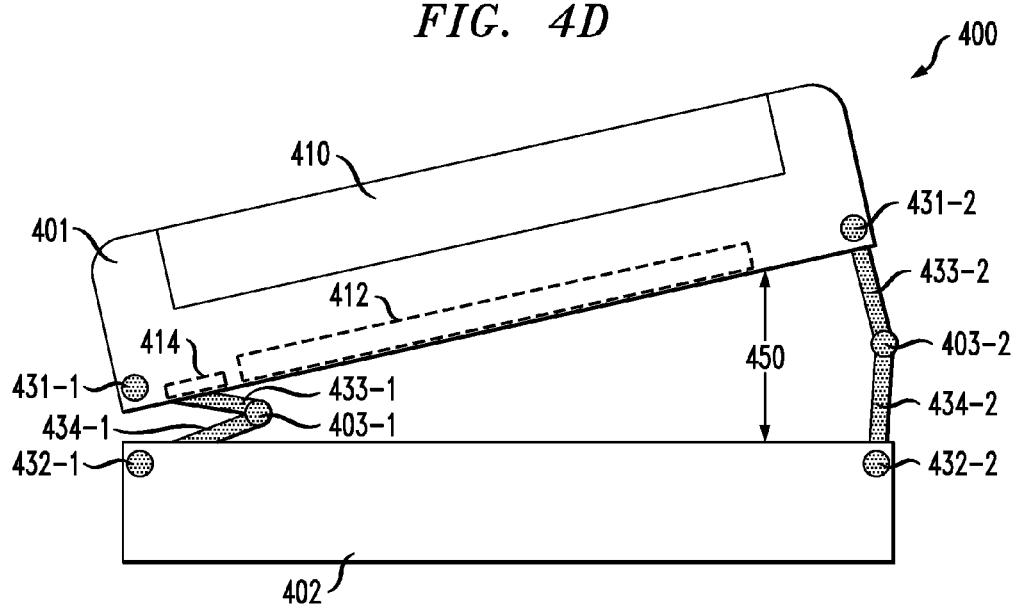
FIG. 4D is a side view depicting the exemplary user device of FIG. 4A in a stand configuration, according to an embodiment of the invention.

FIG. 4D shows the user device 400 in the stand configuration. Top hinge support 433-1 and bottom hinge support 434-1 are rotated about hinge 403-1 such that the distance between hinge 431-1 and hinge 432-1 is smaller than the distance between hinge 431-2 and hinge 432-2.

Figure 4E:
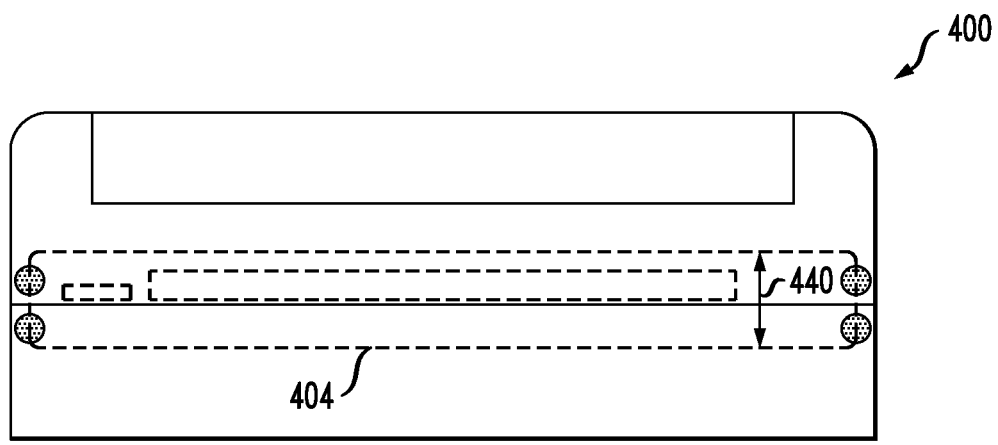
FIG. 4E is a side view depicting the exemplary user device of FIG. 4A with an antenna in the closed configuration, according to an embodiment of the invention.
Figure 4F:
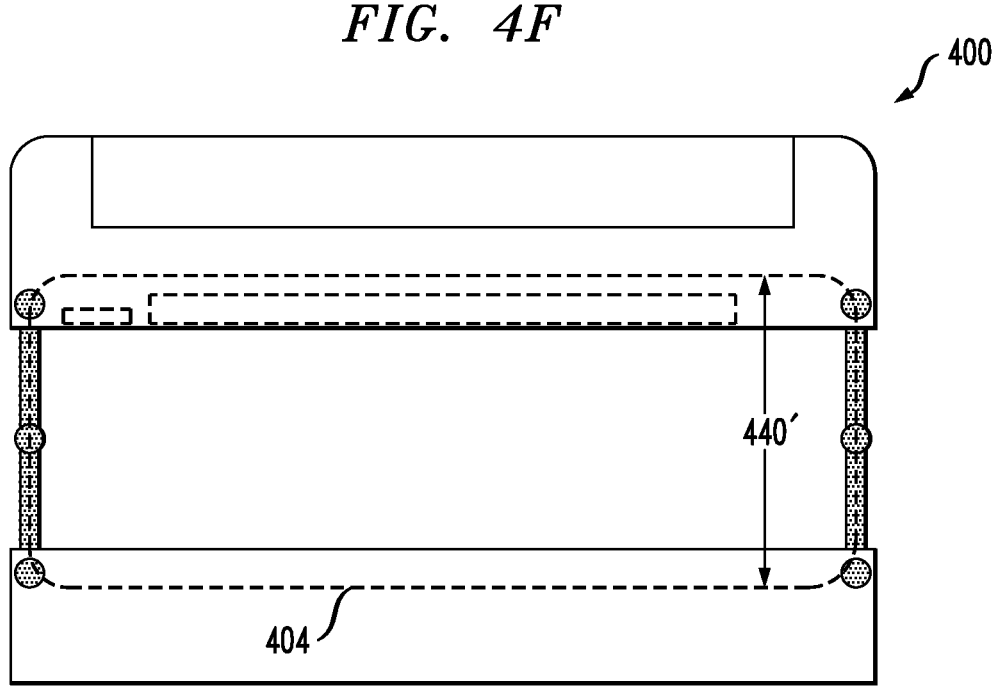
FIG. 4F is a side view depicting the exemplary user device of FIG. 4A with an antenna in the fully open configuration, according to an embodiment of the invention.

FIG. 4E shows a side view of the user device 400 in the closed configuration with a reconfigurable antenna 404. FIG. 4F shows a side view of the user device 400 in the fully open configuration with the reconfigurable antenna 404. The air core 440 of the reconfigurable antenna 404 is smaller in the closed configuration than the air core 440' of the reconfigurable antenna 404 in the fully open configuration.

Figure 5A:
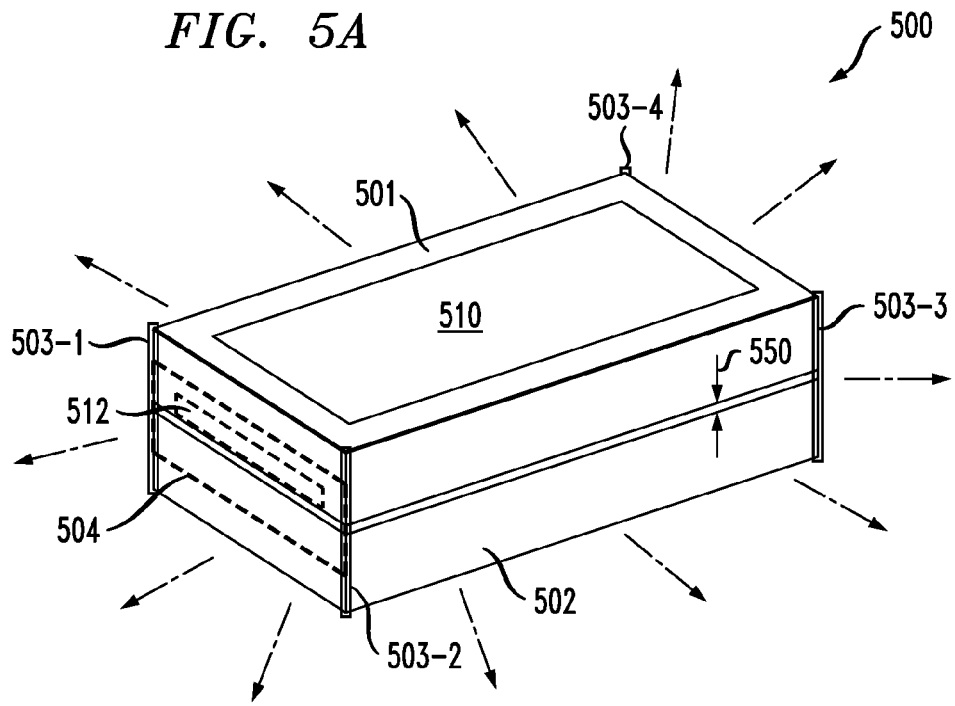
FIG. 5A is a perspective view of an exemplary user device in a closed configuration, according to an embodiment of the invention.
Figure 5B:
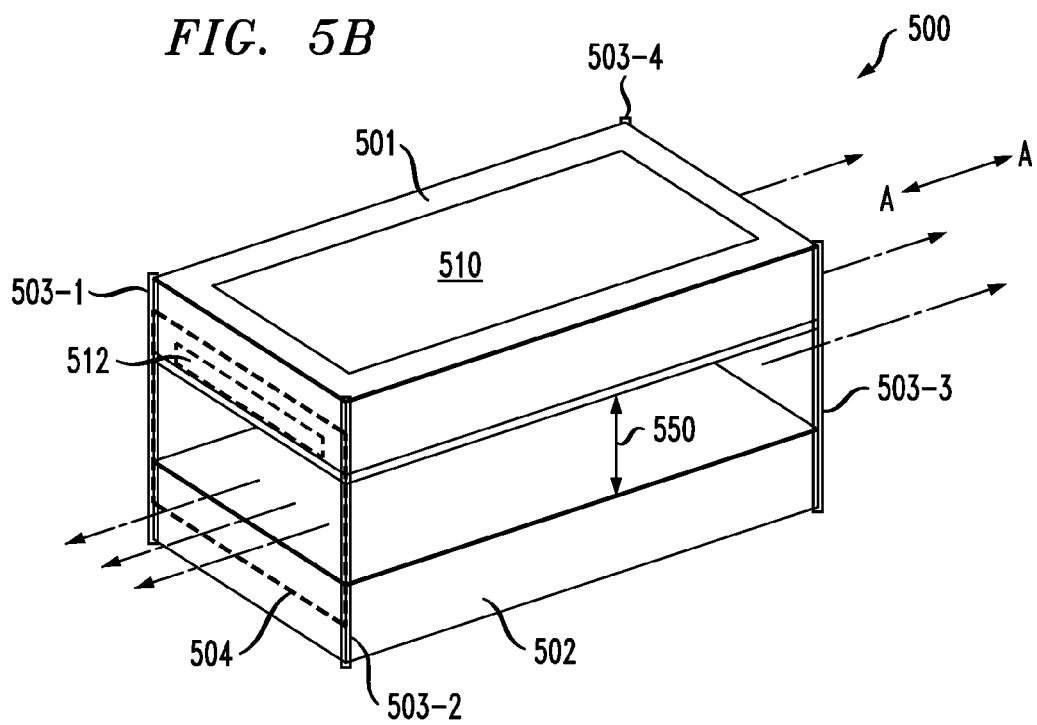
FIG. 5B is a perspective view of the exemplary user device of FIG. 5A in a fully open configuration, according to an embodiment of the invention.

FIG. 5A is a perspective view of a user device 500 in the closed configuration. User device 501 has a top housing 501 and a bottom housing 502. The top housing includes a display 510 and a storage cavity 512. The top housing 501 and bottom housing 502 are connected via supports 503-1, 503-2, 503-3 and 503-4 and separated by a space 550. The supports 503 can be one of or a combination of the sliding supports of user device 200, the telescoping supports of user device 300 and the hinge assembly supports of user device 400. FIG. 5B is a perspective view of the user device 500 in the fully open configuration. In FIGS. 5A and 5B, each of supports 503-1 through 503-4 are fully extended relative to the closed configuration. To place the user device 500 in a stand configuration, supports 503-1 and 503-2 may be extended relative to the closed configuration and supports 503-3 and 503-4 may not extend relative to the closed configuration. In addition, supports 503-2 and 503-3 may extend relative to the closed configuration while supports 503-1 and 503-4 do not extend relative to the closed configuration to position user device 500 in the stand configuration. Numerous other configurations are possible depending on a placement of the supports 503, such as at corners or edges of the user device 500. In some embodiments, the supports 503 are independently adjustable, while in other embodiments two or more supports may not adjust with respect to one another.

FIGS. 5A and 5B also illustrate a further feature of the user device 500. User device 500 has a reconfigurable antenna 504. As discussed above, the larger air core of the reconfigurable antenna 204 in the fully open configuration provides various benefits, including an improvement in the Q factor and lower parasitic inter winding capacitance, leading to an increase in the overall efficiency of the antenna. Reconfigurable antennas 304, 404 and 504 for user devices 300, 400 and 500 provide similar benefits. In addition, the reconfigurable antennas 204, 304, 404 and 504 permit user devices 200, 300, 400, and 500 to switch between a substantially omnidirectional antenna in the closed configuration to a substantially directional antenna in the fully open configuration. In the fully open configuration, reconfigurable antennas 204, 304, 404 and 504 are electrically long, which changes the loop radiation pattern of the reconfigurable antennas 204, 304, 404 and 504 from being substantially omnidirectional to being substantially directional. The reconfigurable antennas 204, 304, 404 and 504 may be considered electrically long based at least in part on the length of the antenna compared to a wavelength of the antenna radiation (i.e., less than one wavelength versus an integer multiple of the wavelength such as 1).

FIGS. 5A and 5B illustrate the radiation pattern of the reconfigurable antenna 504. The radiation pattern is represented by dashed lines pointing outwards from the user device 500 in FIGS. 5A and 5B. In the closed configuration shown in FIG. 5A, user device 500 has a substantially omnidirectional radiation pattern. In the fully open configuration shown in FIG. 5B, the radiation pattern is substantially directional along axis A-A. One skilled in the art will readily appreciate that the reconfigurable antenna can be arranged in a given user device to obtain a directional radiation pattern along a different axis. For example, the reconfigurable antenna may be configured to be substantially directional along an axis perpendicular to axis A-A shown in FIG. 5B.

The reconfigurable antennas 204, 304, 404 and 504 have a variety of applications. One such application is in NFC. For example, the reconfigurable antenna 504 can be an NFC antenna. The directionality in the fully open configuration allows for lower transmit power for NFC, since the radiation pattern is substantially directional. In addition, directionality provides added security and convenience for a user of the user device 500. In the fully open configuration, a user of the user device 500 can point the user device 500 in a particular direction to pair with a desired device. For example, if there are several NFC-enabled devices next to one another or in close proximity to one another, a user can successfully pair with a given one of the NFC-enabled devices by pointing the user device 500 in the direction of the desired NFC-enabled device. This not only provides convenience and ease of use for a user of the user device 500, but it also increases security. If the NFC pairing is used for the exchange of payment or other sensitive information, directionality of the antenna provides an added layer of security. In addition, if the user device 500 is positioned such that the desired NFC-enabled device is at one end of the axis of directionality A-A and the user of the user device is at the opposite end of the axis of directionality A-A, Human Body Model absorption of the antenna radiation will further prevent an unwanted pairing of the user device 500.

Although the reconfigurable antennas 204, 304, 404 and 504 have been described above with specific reference to NFC antennas, the reconfigurable antennas 204, 304, 404 and 504 are not limited solely to NFC antennas. Instead, the reconfigurable antennas 204, 304, 404 and 504 one of or a combination of antenna types, such as those used for radio communication, global positioning system (GPS) communication, Bluetooth® communication, etc.

The term "overlay" as used herein should be construed broadly to encompass a variety of arrangements, including but not limited to those discussed herein and shown in FIGS. 2-5. For example, the term should be understood to encompass any arrangement wherein from a viewpoint directly above a top surface of a top housing, at least a portion of a top surface of the bottom housing is concealed. In the illustrative embodiments of FIGS. 2-5, the top surfaces of the bottom housings 202, 302, 402 and 502 are substantially concealed from a viewpoint directly above the top surfaces of top housings 201, 301, 401, and 501. This is by virtue of the fact that in these embodiments the bottom surfaces of the top housings 201, 301, 401 and 501 and the top surfaces of the bottom housings 202, 302, 402 and 502 are substantially the same size. Numerous other arrangements are possible, including but not limited to arrangements where a bottom surface of a top housing is smaller than a top surface of a bottom housing, and vice-versa.

Again, it should be emphasized that the above-described embodiments of the invention are intended to be illustrative only. Other embodiments can use different types and arrangements of supports connecting the top and bottom housings of a given user device. For example, a given user device may use a combination of the telescoping and hinged support arrangements described above. In addition, while some features have been discussed in detail only for a particular embodiment, these features may be incorporated in other embodiments. By way of example only, the locking mechanism is described above with respect to user device 200, but may be used in conjunction with user devices 102, 300, 400 and 500. These and numerous other alternative embodiments within the scope of the following claims will be apparent to those skilled in the art.

What is claimed is:

1. An apparatus comprising:
a first housing having a top surface and a bottom surface;
a second housing having a top surface and a bottom surface; and
one or more supports coupling the first housing to the second housing such that the first and second housings are electrically connected and the bottom surface of the first housing overlays the top surface of the second housing;
wherein the one or more supports are configurable in at least a first configuration wherein the bottom surface of the first housing and the top surface of the second housing are substantially contiguous with one another and a second configuration wherein the bottom surface of the first housing and the top surface of the second housing are separated by a space; and
wherein an antenna is formed from wiring connected through at least one of the one or more supports coupling the first housing and the second housing, the antenna being substantially omnidirectional in the first configuration and substantially directional in the second configuration.

2. The apparatus of claim 1, wherein the one or more supports are further configurable in a third configuration wherein a first edge of the bottom surface of the first housing is substantially contiguous with a corresponding first edge of the top surface of the second housing and wherein a second edge of the bottom surface of the first housing and a corresponding second edge of the top surface of the second housing are separated by a space.

3. The apparatus of claim 1, wherein at least one display is visible through the top surface of the first housing and the second housing comprises at least one battery.

4. The apparatus of claim 1, wherein the first housing comprises at least one storage cavity accessible from the bottom surface of the first housing.

5. The apparatus of claim 1, wherein at least one of the bottom surface of the first housing and the top surface of the second housing comprises a grip feature.

6. The apparatus of claim 1, wherein at least one of the first housing and the second housing comprises a controller operative to adjust the one or more supports between the first configuration and the second configuration.

7. The apparatus of claim 1, wherein at least one of the first housing and the second housing comprises a controller operative to lock the one or more supports in one of the first configuration and the second configuration.

8. The apparatus of claim 1, wherein in the second configuration the one or more supports are adjustable so as to increase and decrease the space between the bottom surface of the first housing and the top surface of the second housing.

9. The apparatus of claim. 1, wherein at least one of the one or more supports comprises a flexible tubular material.

10. The apparatus of claim 1, wherein the antenna comprises a loop antenna.

11. The apparatus of claim 10, wherein in the first configuration the loop antenna has a first length and in the second configuration the loop antenna has a second length, the second length being greater than the first length.

12. The apparatus of claim 1, wherein the antenna is a near field communication (NFC) antenna.

13. The apparatus of claim 1, wherein at least one of the one or more supports comprises:
a first guide on a vertical edge of a first corner of the first housing;
a second guide on a corresponding vertical edge of a corresponding first corner of the second housing; and
a sliding support connecting the first guide and the second guide.

14. The apparatus of claim 1, wherein at least one of one or more supports comprises:
a first support with an upper end coupled to a vertical edge of a first corner of the first housing via a hinge;
a second support with a lower end coupled to a corresponding vertical edge of a corresponding first corner of the second housing via a hinge;

wherein a lower end of the first support is coupled to an upper end of the second support via a hinge.

15. The apparatus of claim 1, wherein the apparatus is operative to switch between the first configuration and the second configuration without powering off or otherwise disrupting the normal operation of the apparatus.

16. An apparatus comprising:
a first housing having a top surface and a bottom surface;
a second housing having a top surface and a bottom surface; and
one or more supports coupling the first housing to the second housing such that the first and second housings are electrically connected and the bottom surface of the first housing overlays the top surface of the second housing;
wherein the one or more supports are configurable in at least a first configuration wherein the bottom surface of the first housing and the top surface of the second housing are substantially contiguous with one another and a second configuration wherein the bottom surface of the first housing and the top surface of the second housing are separated by a space; and
wherein at least one of the one or more supports comprises:
a first guide on a vertical edge of a first corner of the first housing;
a second guide on a corresponding vertical edge of a corresponding first corner of the second housing; and
a telescoping support connecting the first guide and the second guide, the telescoping support having a first section and a second section coupled via a hinge.

17. A user interface device comprising:
at least one processor operative to generate output at least a portion of which is displayed on at least one display;
a first housing comprising a top surface and a bottom surface;
a second housing comprising a top surface and a bottom surface;
one or more supports coupling the first housing to the second housing; and
an antenna, the antenna being formed from wiring connected through at least one of the one or more supports connecting the first housing and the second housing;
wherein in a first configuration the one or more supports are configured such that the bottom surface of the first housing and the top surface of the second housing are substantially contiguous with one another and in the second configuration the one or more supports are configured such that the bottom surface of the first housing and the top surface of the second housing are separated by a space;
wherein the first housing and the second housing are electrically connected and the bottom surface of the first housing overlays the top surface of the second housing;
wherein the at least one display is viewable through a top surface of the first housing; and
wherein in the first configuration the antenna is substantially omnidirectional and in the second configuration the antenna is substantially directional.

18. The user interface device of claim 17, wherein the user interface device comprises a cellular phone.

19. The user interface device of claim 17, further comprising control circuitry operative to configure at least one of the one or more supports between the first and second configurations.

20. The user interface device of claim 17, wherein the antenna comprises a loop antenna, and wherein in the first configuration the loop antenna has a first length and in the second configuration the loop antenna has a second length, the second length being greater than the first length.

21. A method comprising:
configuring a user interface device in a first configuration wherein a bottom surface of a first housing of the user interface device and a top surface of a second housing of the user interface device are substantially contiguous with one another;
reconfiguring the user interface device in a second configuration wherein the bottom surface of the first housing and the top surface of the second housing are separated by a space;
wherein the first housing and the second housing are coupled via one or more supports which electrically connect the first housing and the second housing;
wherein the bottom surface of the first housing overlays the top surface of the second housing; and
wherein an antenna is formed from wiring connected through at least one of the one or more supports coupling the first housing and the second housing, antenna being substantially omnidirectional in the first configuration and substantially directional in the second configuration.

22. The method of claim 21, wherein the configuring and reconfiguring steps are performed at least in part by control circuitry of the user interface device.

23. The method of claim 21, wherein the antenna comprises a loop antenna, and wherein in the first configuration the loop antenna has a first length and in the second configuration the loop antenna has a second length, the second length being greater than the first length.

* * * * *

UNITED STATES PATENT AND TRADEMARK OFFICE
CERTIFICATE OF CORRECTION

| | | |
|---|---|---|
| PATENT NO. | : 8,744,529 B2 | Page 1 of 1 |
| APPLICATION NO. | : 13/595277 | |
| DATED | : June 3, 2014 | |
| INVENTOR(S) | : Freund et al. | |

It is certified that error appears in the above-identified patent and that said Letters Patent is hereby corrected as shown below:

In the claims:

Claim 9, column 10, line 43, please delete "." after "claim"

Claim 17, column 11, line 46, after "in" please delete "the" and insert --a--

Signed and Sealed this
Twelfth Day of August, 2014

Michelle K. Lee
*Deputy Director of the United States Patent and Trademark Office*